US 12,549,352 B2

(12) United States Patent
Lu et al.

(10) Patent No.: US 12,549,352 B2
(45) Date of Patent: Feb. 10, 2026

(54) IPSEC AWARE LOAD BALANCER WITH MINIMAL DECRYPTION

(71) Applicant: Palo Alto Networks, Inc., Santa Clara, CA (US)

(72) Inventors: Fang Lu, San Jose, CA (US); Peng Chen, San Jose, CA (US); Shu Lin, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 95 days.

(21) Appl. No.: 18/360,224

(22) Filed: Jul. 27, 2023

(65) Prior Publication Data

US 2025/0038971 A1   Jan. 30, 2025

(51) Int. Cl.
*H04L 9/08* (2006.01)
*H04L 47/125* (2022.01)

(52) U.S. Cl.
CPC ............ *H04L 9/088* (2013.01); *H04L 47/125* (2013.01)

(58) Field of Classification Search
CPC .............................. H04L 9/088; H04L 47/125
See application file for complete search history.

(56) References Cited

U.S. PATENT DOCUMENTS

| 2003/0212901 | A1* | 11/2003 | Mishra | H04L 63/0428 726/13 |
| 2005/0273574 | A1* | 12/2005 | Lin | G06F 12/1036 711/E12.065 |
| 2013/0039366 | A1* | 2/2013 | Goyal | H04L 47/39 370/392 |
| 2019/0132296 | A1* | 5/2019 | Jiang | H04L 69/324 |
| 2022/0150058 | A1* | 5/2022 | Tanaka | H04L 9/0852 |
| 2022/0394016 | A1* | 12/2022 | Solanki | H04L 12/4641 |
| 2023/0319111 | A1* | 10/2023 | Lee | H04L 47/125 726/1 |

* cited by examiner

*Primary Examiner* — S M A Rahman
(74) *Attorney, Agent, or Firm* — Gilliam IP PLLC

(57) ABSTRACT

While organizations can employ IPsec based VPNs to securely connect different sites (e.g., branch sites, data centers, and/or virtual private clouds), the security can disrupt network performance by obfuscating information used for load balancing. Disclosed is technology that employs minimal decryption in a secure manner to load balance multiple network traffic flows within a secure connection ("tunnel") across security appliances that effectively operate as alternative endpoints for the tunnel. The security appliances within a load balancing pool are configured/programmed to share tunnel keys with each other after tunnel establishment and with the load balancer. The load balancer uses the tunnel keys to minimally decrypt in a lookaside memory encrypted packets to ascertain N-tuples. The load balancer then uses the N-tuples to load balance the flows within a tunnel across the security appliances.

20 Claims, 4 Drawing Sheets

IPSEC AWARE LOAD BALANCER WITH MINIMAL DECRYPTION

BACKGROUND

The disclosure generally relates to transmission of digital information (e.g., CPC subclass H04L) and to maintenance, administration, or management of data switching networks (e.g., CPC subclass H04L 41/00).

National Institute of Standards and Technology (NIST) Special Publication 800-77 Revision 1 states "Internet Protocol Security (IPsec) is a suite of open standards for ensuring private communications over public networks. IPsec is typically used to encrypt Internet Protocol (IP) traffic between hosts in a network and to create a virtual private network (VPN). IPsec includes two primary protocols: 1) the Internet Key Exchange (IKE) protocol, and 2) the Encapsulating Security Payload (ESP) protocol. The IKE protocol is used to negotiate parameters and security keys. IPsec can be used in tunnel mode or transport mode. In tunnel mode, an IPsec endpoint encrypts a network layer packet (i.e., header and payload) and further encapsulates the encrypted packet with an authentication header and an outer network layer protocol header. In transport mode, an IPsec endpoint encrypts the payload of a network layer packet and inserts an authentication header after the existing network layer protocol header.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses the term "network traffic flow" or "flow" in reference to sequences of communication protocol data units sent between a source and a destination. A flow is identified by an N-tuple, where N is a nonzero whole number, that comprises properties of protocol data units (PDUs). The N-tuple is used as a flow identifier to match PDUs to flows. Properties that are included in the N-tuple of a flow can vary by protocol.

This description also uses the term "connection" in the context of a "secure connection" and a "data connection." "Connection" refers to a logical communication connection between endpoints regardless of the underlying hardware and/or infrastructure involved. In some cases, a logical connection involves a connectionless protocol. A secure connection can be a tunnel carrying encrypted network traffic between security gateways. A data connection can be a network layer connection between a client and a server.

This description uses the term "security appliance" to refer to a device with one or more cybersecurity capabilities or software that can program a machine (physical or virtual) to have one or more cybersecurity capabilities. Examples of a security appliance include a firewall and a next-generation firewall.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

While organizations can employ IPsec based VPNs to securely connect different sites (e.g., branch sites, data centers, and/or virtual private clouds), the security implemented by VPNs can disrupt network performance by obfuscating information used for load balancing. Disclosed is technology that employs minimal decryption in a secure manner to load balance multiple network traffic flows within a secure connection ("tunnel") across security appliances that effectively operate as alternative endpoints for the tunnel. The security appliances within a load balancing pool are configured/programmed to share tunnel keys with each other after tunnel establishment and with the load balancer. The load balancer uses the tunnel keys to minimally decrypt in a lookaside memory encrypted packets to ascertain N-tuples. The load balancer then uses the N-tuples to load balance the flows within a tunnel across the security appliances.

Example Illustrations

Figure 1:
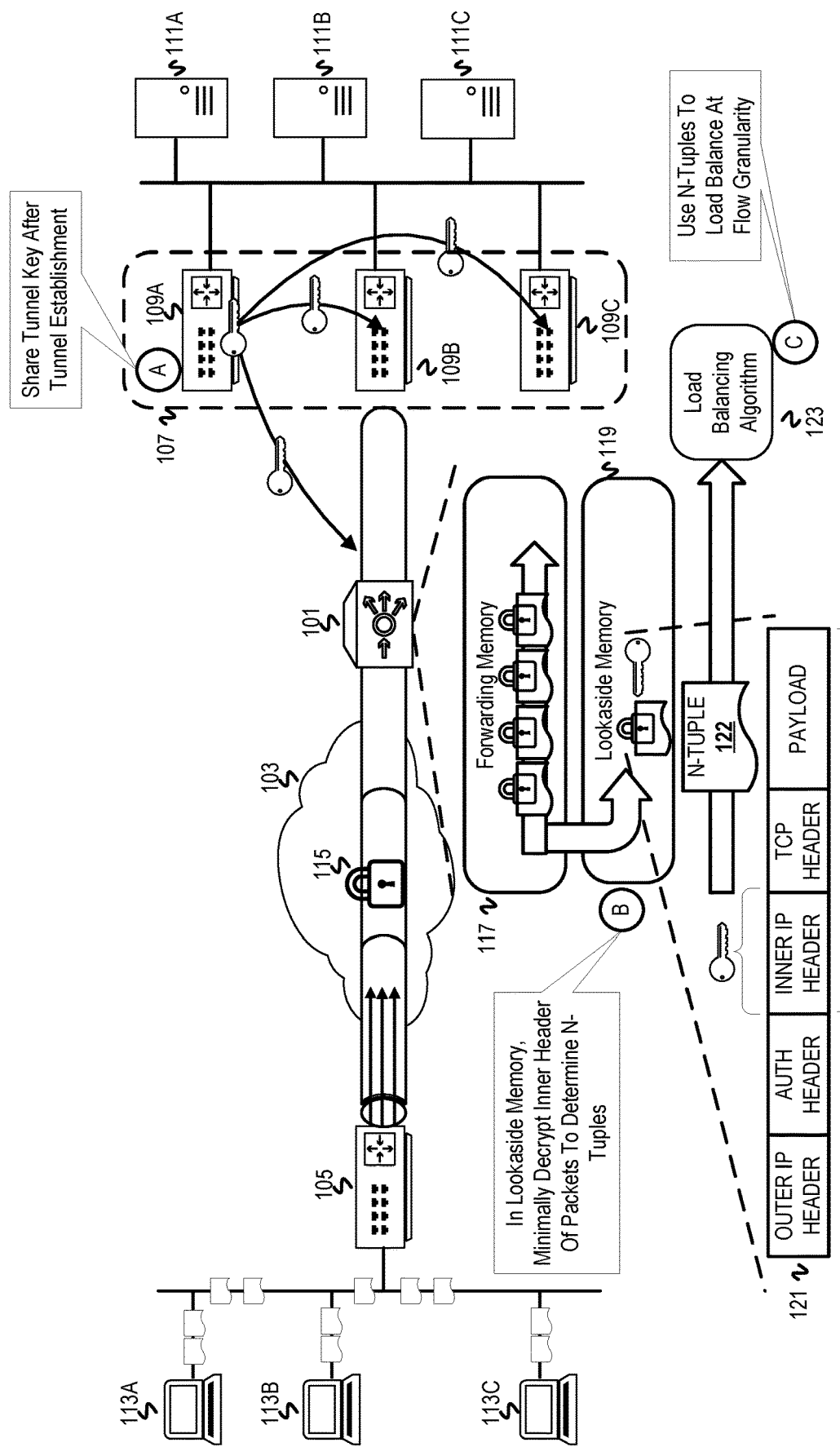
FIG. 1 is a conceptual diagram of secure connection aware load balancing using minimal decryption.

FIG. 1 is a conceptual diagram of a system for secure connection aware load balancing using minimal decryption. FIG. 1 depicts a secure tunnel 115 connecting two networks via a public network 103. A first depicted network includes a security gateway 105 and computers 113A-113C, which operate as data connection endpoints in FIG. 1 (e.g., clients). A second network includes a load balancer 101, a pool of security appliances 107 and compute entities 111A-111C. The pool 107 includes security appliances 109A-109C. The compute entities 111A-111C also operate as data connection endpoints in this illustration (e.g., servers). The first network may be a branch site of an organization and the second network may be a different branch site or virtual private cloud hosting a data center or application(s) of the organization. The secure tunnel 115 carries multiple flows of encrypted network traffic ("encrypted flows") from the data connection endpoints 113A-113C via the security gateway 105, which is a tunnel endpoint with respect to the tunnel 115.

FIG. 1 is annotated with a series of letters A-C, each of which represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the security appliance 109A in the pool 107 shares a cryptographic key ("tunnel key") after establishing of the tunnel 115. When the security gateway 105 initially sends a packet to establish the tunnel 115, the load balancer 101 selects the security appliance 109A according to the load balancing algorithm(s) being implemented by the load balancer 101. Based on the selection of the security appliance 109A, the load balancer 101 will install a destination network address translation (NAT) entry in a NAT table. This will cause the subsequent negotiating and other tunnel establishment communications to be communicated between the security appliance 109A and the security gateway 105. After the tunnel 115 is established, the security appliance 109A shares the tunnel key and corresponding secure connection identifier for the tunnel 115 with the load balancer 101 and the security appliances 109B-109C. When there are multiple tunnels, the secure connection identifiers allow the system to differentiate keys by secure connection identifier to apply the proper key to traffic. Sharing the keys allows the load balancer 101 to minimally decrypt packets of the tunnel 115 and allows the other security appliances 109B-109C to operate as endpoints for inbound traffic of the tunnel 115. In the case of IPsec in tunnel mode, the secure connection identifier is a security parameter index (SPI) and network addresses of the tunnel endpoints (i.e., network addresses of the security gateway 105 and the security appliance 109A). The secure connection identifier and tunnel key are shared together to ensure the correct key is used.

At stage B, the load balancer 101 minimally decrypts network traffic of the tunnel 115 in a lookaside memory 119 using the shared tunnel key. The security gateway 105 uses the tunnel 115 to securely transmit multiple flows of network traffic from the data connection endpoints 113A-113C. The load balancer 101 may handle traffic of various protocols, including traffic that is not tunneled. For ease of explanation, the description refers to a single one of the flows within the tunnel 115. As a packet traverses a forwarding memory 117 in a data plane of the load balancer 101, the load balancer 101 examines the header to determine whether the packet is one in a secure traffic flow. If the load balancer 101 detects that a packet is being transmitted in the tunnel 115, the load balancer 101 uses the tunnel key for the tunnel 115 to decrypt an inner header of the packet to determine an N-tuple. FIG. 1 illustrates example details of a packet 121 detected as being transmitted in the tunnel 115. The packet 121 includes an outer IP header, authentication header, inner IP header, transmission control protocol (TCP) header, and payload. The inner IP header, TCP header, and payload are encrypted. The load balancer 101 uses the tunnel key to decrypt the inner IP header and determine a 3-tuple, for example. The 3-tuple includes the source IP address indicated in the inner IP header, a destination IP address indicated in the inner IP header, and a protocol identifier (e.g., version of the IP protocol).

At stage C, the load balancer 101 uses the N-tuple determined from the minimally decrypted packet to load balance at a specified granularity of flow. The determined N-tuple will at least partially identify a data connection flow within the tunnel 115. The granularity (e.g., 3-tuple or 5-tuple) can be specified by an organization and adjusted to achieve a desired performance. The N-tuple is fed into a load balancing algorithm 123 implemented by the load balancer 101 to direct the packet to one of the security appliances in the pool 107. With the shared keys, the recipient can decapsulate the packet from the tunnel encapsulation and decrypt the packet within, effectively operating as the tunnel endpoint for inbound traffic of the tunnel 115.

To avoid an unnecessarily complicated illustrative description of the technology, additional network traffic traversing the load balancer is not discussed. However, a load balancer with the disclosed technology will maintain in-memory tunnel keys and corresponding secure connection identifiers for multiple tunnels. The load balancer may spawn a thread or child process per secure connection for concurrent decryption operations.

Figure 2:
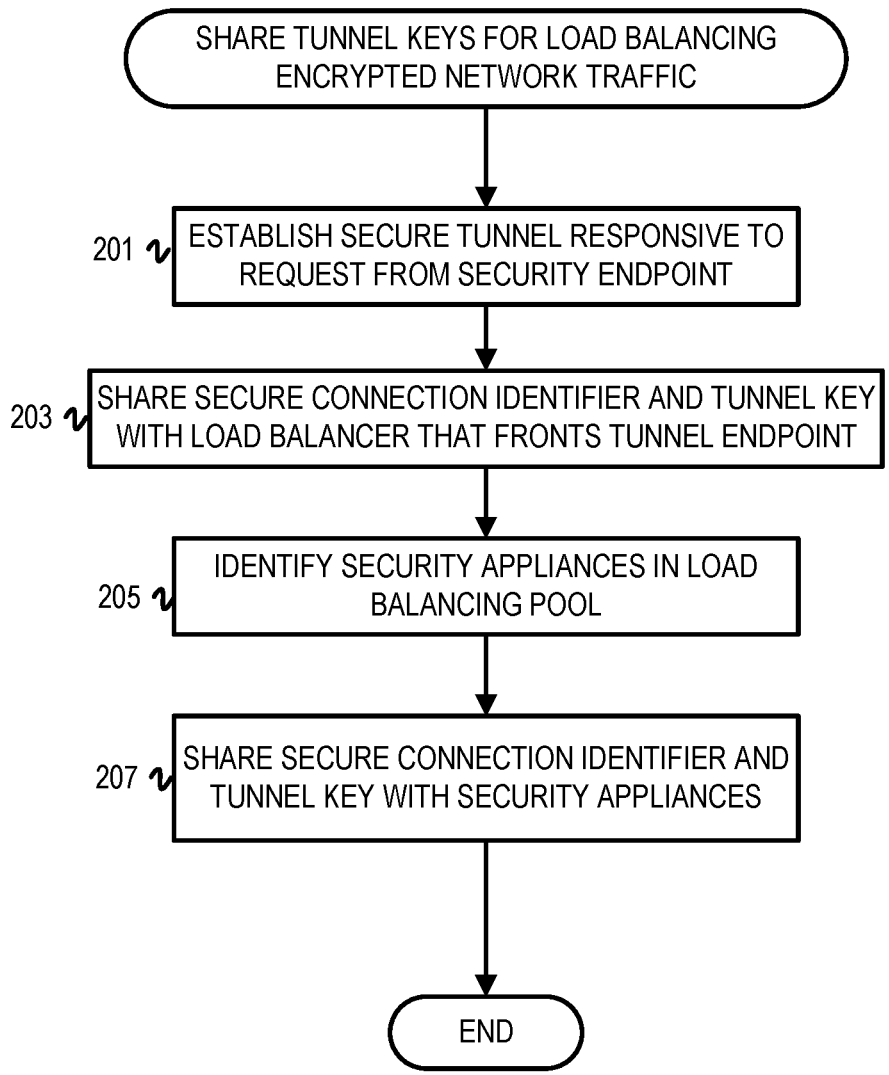
FIG. 2 is a flowchart of example operations for sharing tunnel keys for load balancing encrypted network traffic.

FIG. 2 is a flowchart of example operations for sharing tunnel keys for load balancing encrypted network traffic. The description of FIG. 2 refers to a security appliance as performing the example operations for consistency with FIG. 1. The destination NAT operations at the load balancer are not reflected in the example operations of FIG. 2 since they are separate from the operations of the security appliance.

At block 201, the security appliance establishes a secure tunnel responsive to a request from a security endpoint. A security gateway (e.g., a remote customer edge device) has transmitted a request to begin negotiating with the security appliance to set up a secure tunnel. The security appliance will exchange communications with the remote security endpoint to establish the secure connection. These include the negotiations that result in the cryptographic keys for inbound and outbound PDUs. The communication exchanges also include determining components of a secure connection identifier. For IPsec, the secure connection identifier would be the inbound SPI which would correspond to the inbound cryptographic key.

At block 203, the security appliance shares the secure connection identifier and the inbound tunnel key with a load balancer that fronts the security appliance/tunnel endpoint. The security appliance will have been configured with a network address of the load balancer. To share the keys and secure connection identifiers securely, the security appliance uses a secure protocol or framework. For example, the security appliance can share by communicating according to the gRPC framework. As another example, the security appliance can establish secure tunnels with the load balancer and peer security appliances to share a key and corresponding connection identifier.

At block 205, the security appliance identifies security appliances in the load balancing pool. Other security appliances in the load balancing pool can be identified in a configuration file loaded in the security appliance. The configuration file can also indicate capabilities to filter out security appliances that lack the resources for decrypting PDUs. Implementations may program the security appliance to use a discovery tool or utility (e.g., a network management utility) to discover security appliances in the load balancing pool capable of decrypting PDUs from the secure connection established by the security appliance.

At block 207, the security appliance shares the secure connection identifier and the inbound tunnel key with the identified security appliances. As mentioned previously, the security appliance can use a secure communication (e.g., gRPC messaging or secure tunnel) to share the key and corresponding secure connection identifier.

Figure 3:
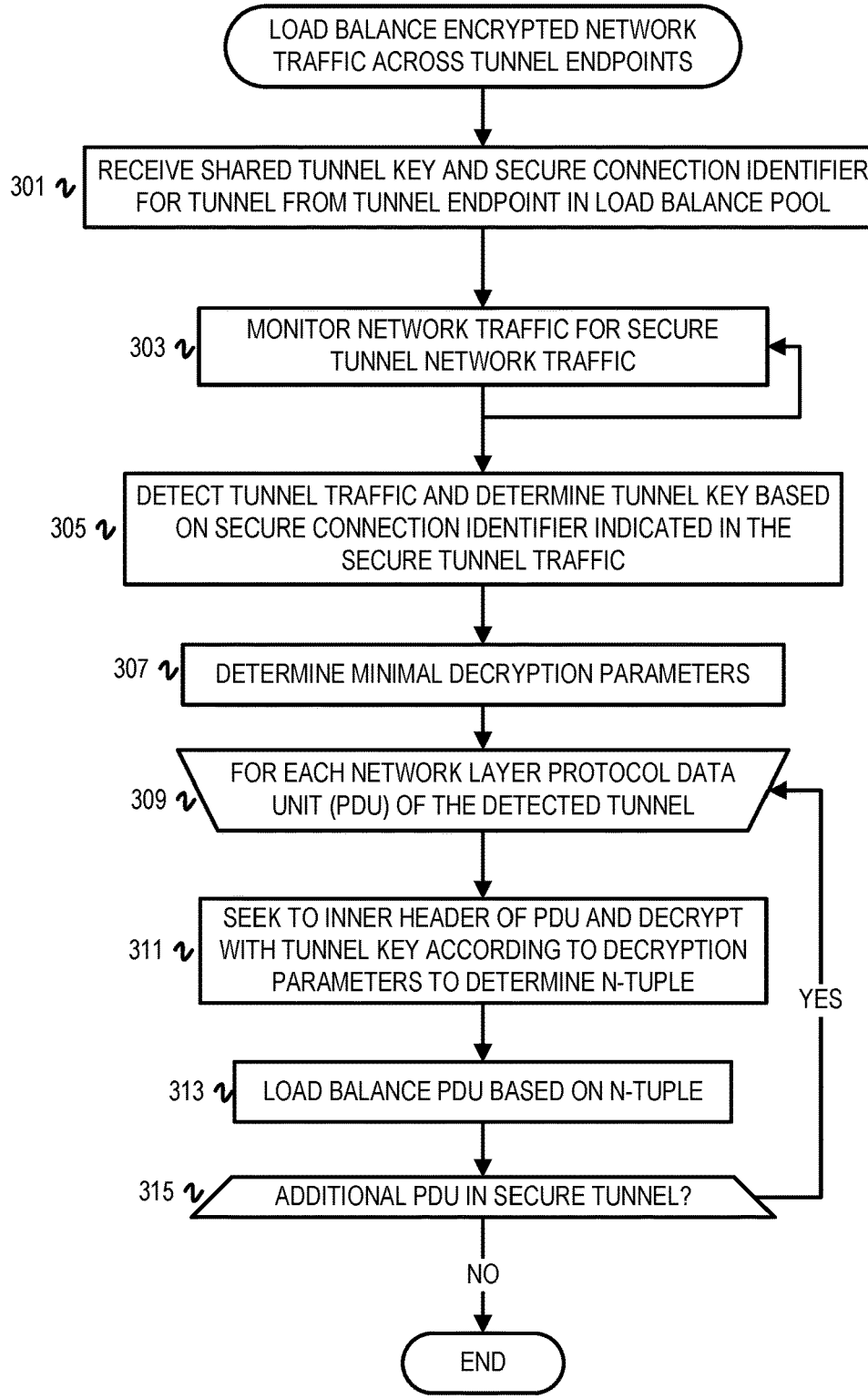
FIG. 3 is a flowchart of example operations for load balancing encrypted network traffic across tunnel endpoints.

FIG. 3 is a flowchart of example operations for load balancing encrypted network traffic across tunnel endpoints. The description of the operations of FIG. 3 refers to a load balancer. The load balancer can be a physical device or a virtual machine launched from an image that includes program code for a load balancer that can minimally decrypt multiple flows of network traffic transmitted via a secure connection.

At block 301, the load balancer receives a secure connection identifier and a corresponding inbound tunnel key shared from a tunnel endpoint in a pool of security appliances. For instance, the tunnel endpoint shares the inbound tunnel key and the secure connection identifier with a direct memory access (DMA) command.

At block 303, the load balancer monitors network traffic received at the load balancer for indication of secure tunnel network traffic ("tunnel traffic"). For example, the load balancer inspects network layer headers of network layer PDUs for indication of a secure protocol, such as a SPI. The monitoring is ongoing, as indicated by a second arrow from block 303 to itself depicted in FIG. 3.

At block 305, the load balancer detects tunnel traffic and determines an inbound tunnel key corresponding to the tunnel traffic. Assuming the load balancer maintains tunnel keys and corresponding secure connection identifiers in an in-memory data structure, the load balancer accesses the data structure to determine whether a secure connection identifier found in a PDU header matches one indicated in the in-memory data structure. If there are n tunnels and $1 < m_n$ traffic flows within each of those tunnels, then the load balancer would maintain n keys each of which can be used on the $m_n$ traffic flows in the corresponding tunnel. The load balancer can compute compact representations of the secure connection identifiers to implement efficient lookup. Upon detection of tunnel traffic by secure connection identifier, the load balancer can set up a matching rule that directs network layer PDUs with a matching secure connection identifier in the header to a processing instance (e.g., thread) for the PDUs of the tunnel. The load balancer can concurrently process the network layer PDUs of different tunnels by secure connection identifier. Thus, multiple instances of blocks 305, 307, 309, 311, 313, 315 can run concurrently.

At block 307, the load balancer determines minimal decryption parameters. Examples of minimal decryption parameters include network address length and load balancing granularity. Network address length can be determined from the network layer protocol (e.g., IPv4 or IPv6). The load balancing granularity is indicated by the N in N-tuple. For instance, a customer or administrator can configure the load balancer to load balance on a 3 or 5-tuple granularity. The load balancer may also adjust the tuple to adjust load balancing granularity according to traffic volume and/or pool size (i.e., number of security appliances available in the pool).

At block 309, the load balancer begins processing each network layer PDU of the tunnel traffic matching the secure connection identifier.

At block 311, the load balancer seeks to an inner header of the PDU and decrypts the inner header with the inbound tunnel key according to the minimal decryption parameter. The load balancer will constrain decryption to the amount of data sufficient to determine a N-tuple that informs the load balancing. The amount of data to decrypt depends on network address length and the N, as well as the encryption algorithm implemented for the tunnel. Using Advanced Encryption Standard—Cipher Block Chaining (AES-CBC) 128 and 3-tuple for IPv4 packets as an example, the load balancer would decrypt the first 32 bytes of the inner IP header to determine the source and destination IP addresses and IP version, which form the 3-tuple. This is because the block size for AES-128-CBC (16 bytes) does not align with the bytes needed to determine the source and destination addresses (i.e., the first 20 bytes). This would be the same for AES-256-CBC since the block size is the same. Variation of how much of the inner IP header is passed to a crypto driver, for example, would depend upon the communication protocol (e.g., IPv4 or v6) and tuple size. In the case of a tuple that includes components in a transport layer header (e.g., TCP or user datagram protocol (UDP) header), the load balancer can read the total length of a packet from an inner IP header and skip to the transport layer header after decrypting a sufficient amount of the IP inner header to determine the tuple components from the inner IP header. To account for the unknown length of the inner IP header due to optional fields, the load balancer can then decrypt a next block and determine whether decrypting the next block is sufficient to ascertain the remaining components of the tuple.

At block 313, the load balancer load balances the PDU based on the N-tuple. The load balancer will forward the PDU to a security endpoint in a load balancing pool of the load balancer according to an implemented load balancing algorithm (e.g., round robin, least connections, weighted round robin, etc.). For session persistence, the load balancer can track flows by the N-tuples in a data structure that allows lookup based on the N-tuple. If a PDU for the same N-tuple has already been forwarded to a security endpoint, then the load balancer could lookup the endpoint based on the N-tuple and forward the PDU accordingly. If a previous PDU for the same N-tuple has not yet been observed, then the load balancer selects a security endpoint based on the load balancing algorithm implementation. Since the load balancer may not detect when a flow within a secure tunnel ends or becomes inactive, the load balancer can remove N-tuples from the lookup structure after a defined time period and or constrain the number of entries in the lookup structure and implement the lookup structure as a first-in-first-out data structure.

At block 315, the load balancer determines whether there is another PDU in the tunnel. The load balancer reads a next received PDU and determines which tunnel the next received PDU corresponds to, if any. Embodiments can separate PDUs of detected tunnels with buffers. For example, after detection of s secure tunnel, the load balancer can allocate a buffer for the tunnel and direct PDUs of the tunnel to the buffer. The load balancer would continue reading PDUs inserted into the buffer while they are received into the buffer. The allocated buffer would be from the forwarding memory and decryption would still utilize a lookaside memory for decryption operations. If there is an additional PDU of the secure tunnel, then operational flow returns to block 309. Otherwise, the portion of the operational flow for the secure tunnel ends but traffic monitoring continues as well as other concurrent processes for other active tunnels.

VARIATIONS

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 205 and 207 may be performed prior to block 203 or concurrently with block 203. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
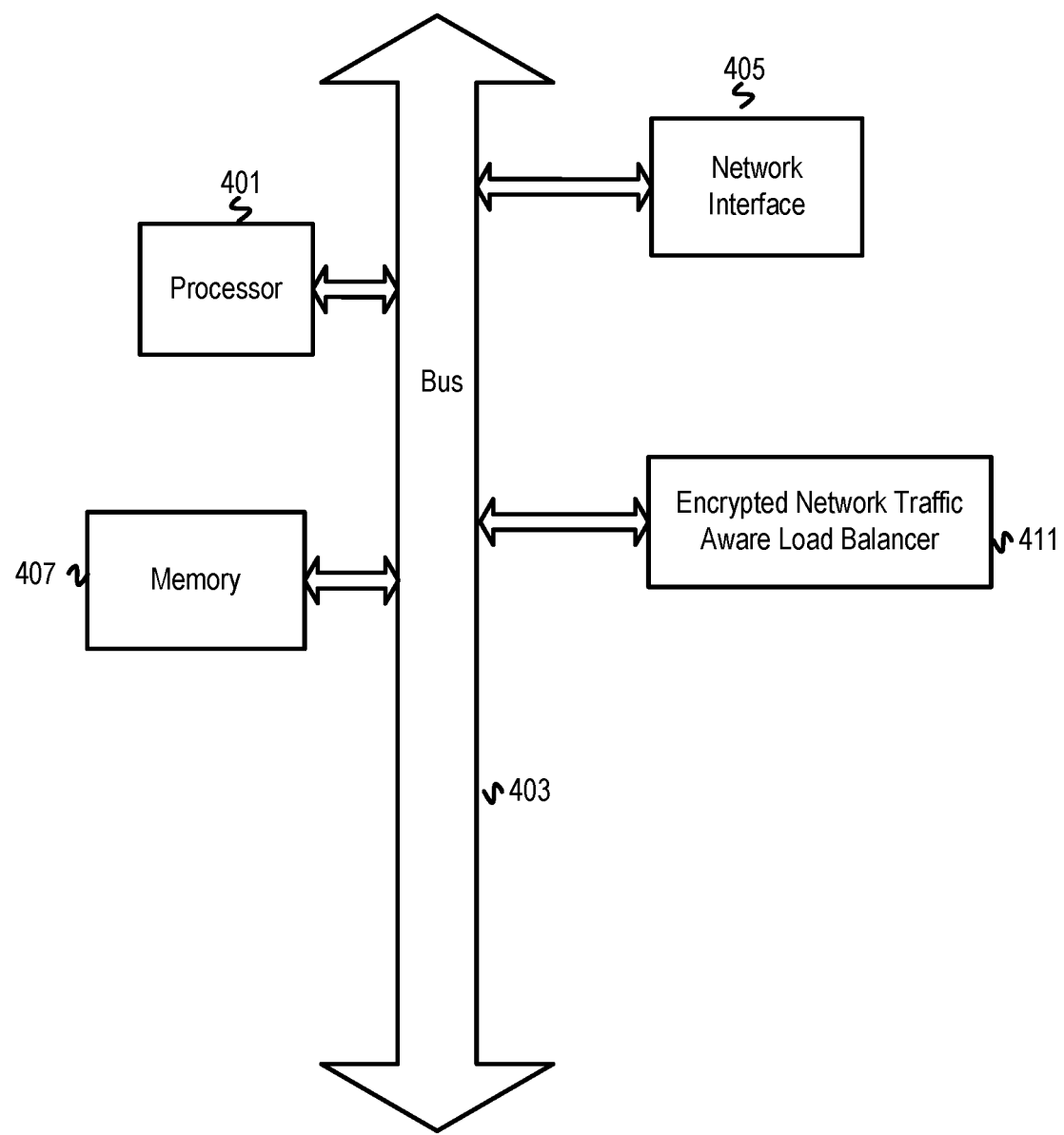
FIG. 4 depicts an example computer system with an encrypted network traffic aware load balancer.

FIG. 4 depicts an example computer system with an encrypted network traffic aware load balancer. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes an encrypted network traffic aware load balancer 411. The encrypted network traffic aware load balancer 411 detects secure tunnel encapsulated network traffic and uses a cryptographic key previously shared from a tunnel endpoint behind the encrypted network traffic aware load balancer 411. The encrypted network traffic aware load balancer 411 minimally decrypts inner headers of packets to ascertain a N-tuple, which the encrypted network traffic aware load balancer 411 can use to track network traffic flows within the secure tunnel. With the N-tuple to differentiate traffic flows aggregated into the secure tunnel, the load balancer can load balance flows across a pool of security endpoints within a load balance pool. Thus, the other security endpoints in the pool can effectively operate as alternative endpoints for the same tunnel, at least with respect to inbound traffic secured within the tunnel. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

The invention claimed is:

1. A method comprising:
load balancing multiple network traffic flows communicated via a secure tunnel across multiple network devices with minimal decryption, wherein load balancing with minimal decryption comprises,
decrypting at least part of inner headers of protocol data units of the multiple network traffic flows to determine at least a part of networking N-tuples indicated in the inner headers, wherein the protocol data units are encrypted according to a protocol of the secure tunnel; and
load balancing the protocol data units across the multiple network devices based, at least partly, on the determined networking N-tuples, wherein a first of the multiple network devices that established the secure tunnel shared a cryptographic key with a load balancer that performs the minimal decryption and with others of the multiple network devices.

2. The method of claim 1, wherein the secure tunnel is an Internet Protocol Secure (IPsec) tunnel.

3. The method of claim 1, wherein decrypting part of the inner headers of protocol data units of the multiple network traffic flows comprises decrypting the protocol data units in a lookaside memory, wherein the lookaside memory is distinct from memory allocated for forwarding network traffic.

4. The method of claim 1, wherein the inner headers of the protocol data units are Internet Protocol (IP) headers within a tunneling encapsulation according to the protocol of the secure tunnel, wherein the tunneling encapsulation includes an outer IP header.

5. The method of claim 1, wherein decrypting at least part of the inner headers of protocol data units communicated via the secure tunnel comprises decrypting a first block of an inner header according to an encryption algorithm of the secure tunnel, determining length of the inner header indicated in the decrypted first block, and determining whether to decrypt a second block of the inner header based on the length of the inner header and whether the N-tuple can be determined from the decrypted first block of the inner header.

6. The method of claim 1, wherein decrypting at least part of inner headers of protocol data units is based, at least in part, on the N specified for the N-tuples and length of the inner headers.

7. The method of claim 6, wherein the length of the inner headers is based the network layer protocol of the protocol data units.

8. The method of claim 1 further comprising inspecting network traffic at the load balancer to detect protocol data units being transmitted in a secure tunnel.

9. A non-transitory, machine-readable medium having load balancing program code stored thereon, the program code comprising instructions to:
 load balance multiple network traffic flows communicated via a secure tunnel across multiple network devices for the secure tunnel with minimal decryption, wherein the instructions to load balance with minimal decryption comprise instructions to,
  decrypt at least part of inner headers of packets of the multiple network traffic flows to determine networking N-tuples indicated in the inner headers, wherein the packets are encrypted according to a protocol of the secure tunnel; and
  load balance the network traffic flows across the multiple network devices based, at least partly, on the determined networking N-tuples.

10. The non-transitory, machine-readable medium of claim 9, wherein the secure tunnel is an Internet Protocol Secure (IPsec) tunnel.

11. The non-transitory, machine-readable medium of claim 9, wherein the instructions to decrypt part of the inner headers of packets of the multiple network traffic flows comprise instructions to decrypt the packets in the lookaside memory, wherein the lookaside memory is distinct from memory allocated for forwarding network traffic.

12. The non-transitory, machine-readable medium of claim 9, wherein the inner headers of the protocol data units are Internet Protocol (IP) headers within a tunneling encapsulation according to the protocol of the secure tunnel, wherein the tunneling encapsulation includes an outer IP header.

13. The non-transitory, machine-readable medium of claim 9, wherein the instructions to decrypt at least part of the inner headers of packets communicated via the secure tunnel comprise instructions to decrypt a first block of an inner header according to an encryption algorithm of the secure tunnel, determine length of the inner header indicated in the decrypted first block, and determining whether to decrypt a second block of the inner header based on the length of the inner header and whether the N-tuple can be determined from the decrypted first block of the inner header.

14. The non-transitory, machine-readable medium of claim 9, wherein the instructions to decrypt at least part of inner headers of packets comprise instructions to decrypt based, at least in part, on the N specified for the N-tuples.

15. The non-transitory, machine-readable medium of claim 9, wherein the program code further comprises instructions to inspect network traffic to detect packets being transmitted in a secure tunnel.

16. An apparatus comprising:
 a processor;
 set of one or more network interfaces;
 a plurality of memories, wherein at least a first of the plurality of memories is allocated for forwarding network traffic; and
 at least a second of the plurality of memories having instructions stored thereon that are executable by the processor to cause the apparatus to,
 load balance multiple flows of network traffic communicated via a secure tunnel across multiple endpoints for the secure tunnel with minimal decryption, wherein the instructions to load balance with minimal decryption comprise instructions to,
  decrypt at least part of inner headers of packets of the multiple network traffic flows to determine networking N-tuples indicated in the inner headers, wherein the packets are encrypted according to a protocol of the secure tunnel; and
  load balance the network traffic flows across the multiple endpoints based, at least partly, on the determined networking N-tuples.

17. The apparatus of claim 16, wherein the instructions to decrypt at least part of the inner headers of packets of the multiple network traffic flows comprise instructions to decrypt the packets in the third memory.

18. The apparatus of claim 17, wherein the third memory and the first memory are physically isolated from each other, logically isolated from each other, or virtually isolated from each other.

19. The apparatus of claim 16, wherein the instructions to decrypt at least part of inner headers of packets comprise instructions executable by the processor to decrypt at least part of the inner headers based, at least in part, on the N specified for the N-tuples.

20. The apparatus of claim 16, wherein the instructions stored in the second memory comprise instructions executable by the apparatus to inspect network traffic to detect packets being transmitted in a secure tunnel.

* * * * *